United States Patent
Nishiguchi et al.

(10) Patent No.: US 6,242,097 B1
(45) Date of Patent: Jun. 5, 2001

(54) CABLE

(75) Inventors: Masaki Nishiguchi; Dai Hashimoto; Hitoshi Yamada; Ryoji Ohno, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/121,808

(22) Filed: Aug. 5, 1998

(30) Foreign Application Priority Data

Aug. 6, 1997 (JP) ..................................... 9-212308

(51) Int. Cl.⁷ ........................... B32B 27/12; B32B 15/06; B21D 39/00; H01B 7/02
(52) U.S. Cl. ........................... 428/383; 428/623; 428/625; 428/626; 428/632; 774/110 SR; 774/110 SY; 774/110 N
(58) Field of Search ..................................... 428/623, 625, 428/626, 632, 474.4, 474.7, 475.2, 480, 482, 500, 383, 423.1, 423.3, 423.5, 423.7, 424.2, 483, 476.3; 525/424, 425, 92 A, 92 B; 524/505, 538; 174/110 SR, 110 SY, 110 N (56) References Cited

U.S. PATENT DOCUMENTS

| | | | |
|---|---|---|---|
| 4,918,127 | * | 4/1990 | ADur et al. .......................... 524/415 |
| 4,963,698 | * | 10/1990 | Chang et al. ....................... 174/77 R |
| 5,861,463 | * | 1/1999 | Sehanobish et al ................. 525/240 |
| 5,993,924 | * | 11/1999 | Deroch et al. ..................... 428/36.91 |
| 6,064,002 | * | 5/2000 | Hayami et al. ..................... 174/52.1 |

FOREIGN PATENT DOCUMENTS

| | | |
|---|---|---|
| 2199708 | 8/1990 | (JP) . |
| 945399 | 2/1997 | (JP) . |

* cited by examiner

*Primary Examiner*—Paul Thibodeau
*Assistant Examiner*—Holly Rickman
(74) *Attorney, Agent, or Firm*—Birch, Stewart, Kolasch & Birch, LLP (57) ABSTRACT

There is disclosed a cable having a covering layer on the outside of a multicore stranded wire composed of plural insulated conductors that are intertwined, wherein at least an outermost layer of the covering layer is made of a crosslinked product of a resin composition containing (a) 10 to 60% by weight of a polyamide elastomer made up of a block copolymer whose hard segment is a polyamide, (b) 5 to 60% by weight of a thermoplastic polyurethane resin, (c) 10 to 60% by weight of a thermoplastic polyester elastomer, and (d) 0 to 20% by weight of a thermoplastic styrene elastomer. The airtightness and the watertightness at the interface between the cable and a molded body are kept for extended periods without taking any particular sealing measures. The corrosion of the conductors in the cable and the deterioration of the performance of the connected parts of machinery and tools can be prevented, and the cable has excellent water resistance.

16 Claims, 2 Drawing Sheets

CABLE

FIELD OF THE INVENTION

The present invention relates to a cable which is usable in automobiles, robots, electronic machinery and tools, and the like. More specifically, the present invention relates to an electric cable (hereinafter also referred to as a cable) that has excellent mechanical properties and flexibility and is preferably suitable for molding working with two types of thermoplastic resins, i.e. a polybutylene terephthalate (hereinafter also referred to as PBT) resin, and a polyamide (hereinafter also referred to as PA) resin, so that after an end section of the cable is connected to various sensors, terminals, or the like, the connected section may be kept airtight or watertight.

BACKGROUND OF THE INVENTION

As insulating covering materials of cables used in automobiles, robots, electronic machinery and tools, and the like, thermoplastic polyurethane resin compositions having good mechanical properties and flexibility are employed. In many cases, after the thermoplastic polyurethane resin compositions are molded, they are irradiated with ionizing radiation to effect crosslinking, in order to improve heat resistance, chemical resistance, and water resistance.

When such a cable is connected to an electrode terminal or a part of machinery and tools, such as a sensor, the connected section and the nearby part around it are protected in an airtight manner or watertight manner by molding with a mold resin (a molded body).

In order to secure the airtightness or watertightness with a mold resin in this way, PBT resins and PA resins are often used as molding materials, since they are readily molded and have excellent mechanical strength.

However, depending on the choice of the covering material on the cable and the molding material, the difference in heat shrinkage factor between the materials causes the problem that the heating and cooling processes at the time of end working or during use bring about a gap at the interface between the cable and the molded body, and water penetrates through the gap formed at the interface. When water penetrates through the gap formed at the interface, the conductors of the cable are corroded and malfunctions, including deterioration of the performance of the connected part of machinery and tools, occur. Therefore, various sealing measures for securing airtightness and watertightness are needed. As a result, the operation at the time of end working becomes extremely complicated, and thus the operation requires a high degree of skill.

To solve such a problem, it is conceivable that, taking the adhesion between the covering material of the cable and the molding material into account, the covering material may be made of a material that is the same as or similar to the molding material, but these resin materials have poor formability and workability as a covering material of cables, and they have a problem in the flexibility thereof that is required for electric wires. Further, even in the case of covering materials whose adhesion to molding materials is satisfactory as an initial property, if the materials fail in airtightness or watertightness in a heat shock test or show deterioration of the properties in a water resistance test, they are not practical for long-term usage.

SUMMARY OF THE INVENTION

An object of the present invention is to provide a cable that can keep airtightness and watertightness for a long period of time at the interface between the cable and a molded body, even without applying any particular sealing measures for retention of the airtightness and watertightness; that can prevent corrosion of the conductors of the cable and deterioration of the performance of a connected part of machinery and tools, and that is excellent in water resistance.

Other and further objects, features, and advantages of the invention will appear more fully from the following description, taken in connection with the accompanying drawings.

DETAILED DESCRIPTION OF THE INVENTION

The inventors of the present invention, having investigated intensively to attain the above object, have found that by using, as resin components of a covering material, a thermoplastic polyester elastomer having an adhesive force to a molding material, a polyamide-series elastomer, and a polyurethane in combination in a specified ratio, the combination has excellent hydrolysis resistance and can adhere to two types of molding materials, i.e. polyamides (nylons) and polyesters, with the strength and the abrasion resistance retained. The inventors have also found that by using, in addition to the combination, a thermoplastic styrene-series elastomer that, when used singly, has hardly any adhesive force to a molding material, a greater adhesive force to a molding material can be obtained, leading to the completion of the present invention.

That is, the present invention provides:

(1) A cable having a covering layer on the outside of a multicore stranded wire composed of plural insulated conductors that are intertwined, wherein at least an outermost layer of the said covering layer is made of a crosslinked product of a resin composition containing, as resin components, (a) 10 to 60% by weight of a polyamide-series elastomer made up of a block copolymer whose hard segment is a polyamide, (b) 5 to 60% by weight of a thermoplastic polyurethane resin, (c) 10 to 60% by weight of a thermoplastic polyester elastomer, and (d) 0 to 20% by weight of a thermoplastic styrene-series elastomer;

(2) The cable as stated in the above (1), wherein fine-grain silica is contained in an amount of 0.5 to 5 parts by weight per 100 parts by weight of the total amount of the resin components in the said resin composition;

(3) The cable as stated in the above (1) or (2), wherein the said covering layer is made up of two layers, and its inner layer is composed of a resin composition whose base resin is at least one selected from the group consisting of ethylene-vinyl acetate/vinyl chloride graft copolymers, thermoplastic polyamide elastomers, thermoplastic polyester elastomers, and thermoplastic polyurethanes;

(4) The cable as stated in the above (1) or (2), wherein the said covering layer is made up of two layers, and its inner layer is composed of a resin composition whose base resin is at least one selected from the group consisting of ethylene/vinyl acetate copolymers and ethylene/α-olefin copolymers having a density of 0.86 to 0.90 g/cm³.

In the cable of the present invention, the covering layer provided on the multicore stranded wire made up of insulated conductors that are intertwined, may be made up of one layer or plural layers. When the covering layer is made up of plural layers, the covering can be carried out by simultaneous extrusion, or alternatively after an inner layer is placed on, the next outer layer may be placed on, and so on, successively.

At that time, at least the outermost layer of the covering layer is made of a resin composition containing, as resin components, (a) 10 to 60% by weight of a polyamide-series elastomer made up of a block copolymer whose hard segment is a polyamide, (b) 5 to 60% by weight of a thermoplastic polyurethane resin, (c) 10 to 60% by weight of a thermoplastic polyester elastomer, and (d) 0 to 20% by weight of a thermoplastic styrene-series elastomer.

Hereinbelow, a mode of the present invention is described.

Figure 1:
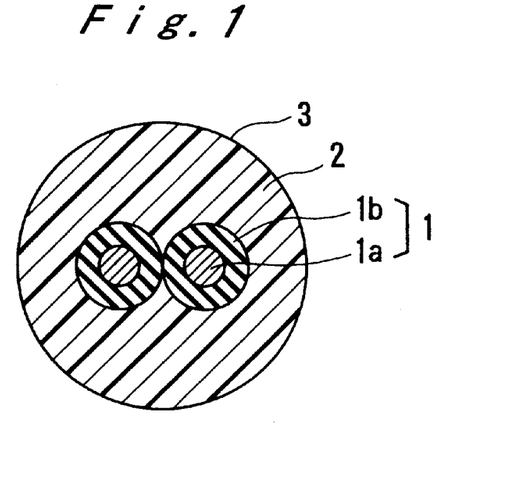
FIG. 1 is a cross-sectional view showing an embodiment of the cable of the present invention.

FIG. 1 is a schematic cross-sectional view showing one mode of the cable of the present invention. Numeral 1 indicates a multicore stranded wire, and the multicore stranded wire 1 is made up of plural insulated conductors that are intertwined (two intertwined insulated conductors in FIG. 1) each having a conductor (e.g. a stranded conductor having a diameter of 1 mmφ that are formed by intertwining 20 tin-plated annealed copper wires each having an outer diameter of 0.18 mmφ) 1a provided with an insulating layer 1b thereon made of a polyethylene resin composition, a polyvinyl chloride resin composition, or the like. Numeral 2 indicates a covering layer covering the multicore stranded wire 1, and the covering layer 2 is made of a layer formed by crosslinking to a suitable extent a resin composition containing, as resin components, the above block copolymer whose hard segment is a polyamide, the above thermoplastic polyurethane resin, and the above thermoplastic polyester elastomer plus the above thermoplastic styrene-series elastomer (not an essential component). Numeral 3 indicates a cable thus constituted.

Figure 2:
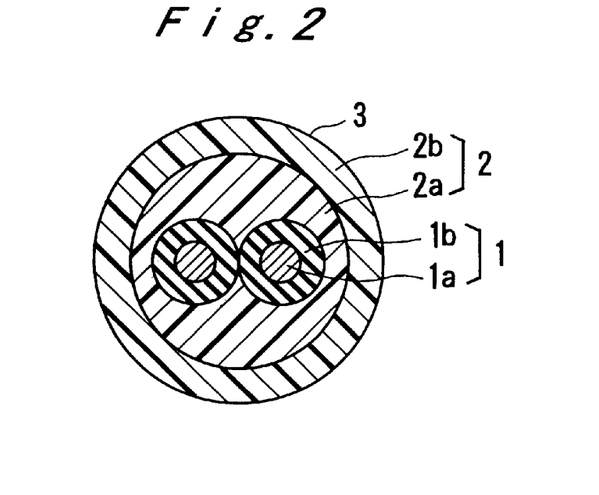
FIG. 2 is a cross-sectional view showing another embodiment of the cable of the present invention.

Preferably the covering layer provided on the outside of the multicore stranded wire is made up of two or more layers, to increase the roundness of the cross section of the cable, and FIG. 2 shows an embodiment thereof. In the figures, the same reference numerals are applied to the same parts or materials. As shown in FIG. 2, the covering layer 2 covering the multicore stranded wire 1 can be made up of plural layers (two layers 2a and 2b in FIG. 2), and the inner layer 2a can be made of a resin composition whose base resin is at least one selected from the group consisting of-ethylene-vinyl acetate/vinyl chloride graft copolymers, thermoplastic polyamide elastomers, thermoplastic polyester elastomers, and thermoplastic polyurethanes, or a resin composition whose base resin is at least one selected from the group consisting of ethylene/vinyl acetate copolymers and ethylene/α-olefin copolymers having a density of 0.86 to 0.90 g/cm³. The inner layer may be a layer that is crosslinked to a suitable extent.

The outer layer 2b of the covering layer 2 is made up of a layer formed by crosslinking to a suitable extent a resin composition containing, as resin components, the above polyamide-series elastomer made up of a block copolymer whose hard segment is a polyamide, the above thermoplastic polyurethane resin, the above thermoplastic polyester elastomer, and the above thermoplastic styrene-series elastomer (not an essential component).

In the cable of the present invention, the outermost layer of the covering layer provided on the multicore stranded wire is made of a crosslinked product of a specific resin composition. Therefore, the adhesion between the cable covering material at the cable end section and a molding material (a molded body) is quite high. Accordingly, the problem of the defective airtightness and watertightness at the interface between the cable and the molding material (molded body) can be solved that is caused by high temperatures and high pressures at the time when the end section of the cable is molded with a resin, or that is caused by repeated heating and cooling at the time of use.

The block copolymer for use in the present invention whose hard segment is a polyamide is a flexible thermoplastic elastomer. The soft segment thereof is not particularly restricted, but polyethers are widely used as the soft segment. This block copolymer is called a polyamide elastomer.

As such a block copolymer, for example, "Pebax" (trade name; manufactured by Toray Industries, Inc.) is placed on the market, and commercially available products of various grades can suitably be chosen and used, with preference given to one having a hardness of 80 to 90 (Shore A), taking the flexibility and the heat resistance of the cable into consideration.

As the thermoplastic polyurethane resin for use fin the present invention, polyester-series urethane resins (of an adipate-series, a caprolactone-series, and a polycarbonate-series) and polyether-series urethane resins can be mentioned, and in view of the water resistance, the mildew resistance, and the like, polyether-series urethane resins are preferable.

Further, the hardness of the thermoplastic polyurethane (type A durometer, 1 kgf) is preferably 90 or less.

The thermoplastic polyester elastomer for use in the present invention is a block copolymer of hard segments composed of an aromatic polyester, such as a polybutylene terephthalate and a polybutylene isophthalate, with soft segments composed of an aliphatic polyether, such as a polytetramethylene ether glycol.

As such a thermoplastic polyester elastomer, for example, "Hytrel" (trade name; manufactured by Toray-Du Pont Co., Ltd.) and "Pelprene" (trade name; manufactured by Toyobo Co., Ltd.) are placed on the marked, and commercially available products of various grades can suitably be chosen and used.

As the thermoplastic styrene-series elastomer for use in the present invention, can be mentioned, for example, an SB-series block copolymer made from styrene (S) and butadiene (B), an SEB-series block copolymer made by saturating the unsaturated double bonds in the above butadiene block by hydrogenation, and an SEP-series block copolymer made from styrene (S) and ethylene/propylene (EP), and also in addition thereto, for example, an SEB-series block copolymer made by making the end section of a random copolymer of styrene (S) and butadiene (B) into a styrene block and hydrogenating it can be used.

Further, for the purpose of improving the compatibility, those obtained by modifying these copolymers with an unsaturated carboxylic acid and its derivative, such as maleic anhydride and glycidyl methacrylate, can be used.

As such products, for example, "Kraton" (trade name; manufactured by Shell Chemical Company), "Toughprene,"

"Asaprene," and "Toughtec" (trade names; manufactured by Asahi Chemical Industry Co., Ltd.), "Septon" (trade name; manufactured by Kuraray Co., Ltd.) and "Dynaron" (trade name; manufactured by Japan Synthetic Rubber Co., Ltd.) are placed on the market, and commercially available products of various grades can suitably be chosen and used.

Among these styrene-series thermoplastic elastomers, those of an SEP-series are preferable in view of the weathering resistance, and particularly the use of those of grades excellent in flexibility is preferred.

As for the thermoplastic styrene-series elastomer for use in the present invention, when it is used singly, it can be said that it exhibits almost no adhesive force for injection molding materials, such as a PBT resin and a polyamide resin. However, when it is blended with the other three components together with the thermoplastic polyester elastomer in a specific blending amount range, a greater adhesiveness is exhibited.

If the amount of the blending of the thermoplastic styrene elastomer is over 20% by weight in the resin components, the strength of the composition is lowered conspicuously and the abrasion resistance is also lowered.

For this reason, the amount of the blending of the thermoplastic styrene elastomer is defined to be 20% by weight or less, preferably 5 to 20% by weight, in the resin components.

Next, a description is made about the amounts of the blending of the elastomer whose hard segment is a polyamide, the polyurethane resin, and the thermoplastic polyester elastomer that are the resin components in the resin composition constituting at least the outermost layer of the covering layer of the cable of the present invention.

The amount of the blending of the elastomer whose hard segment is a polyamide is in the range of 10 to 60% by weight in the resin components. When the amount of the blending of the elastomer whose hard segment is a polyamide falls in this range, not only the physical strength is retained as the cable outer layer material but also the abrasion properties are improved.

Further, the amount of the blending of the polyurethane resin is in the range of 5 to 60% by weight in the resin components. When the amount of the blending of the polyurethane falls in this range, not only the compatibility of the resin composition composed of the three to four components is increased to make the outward appearance of the cable good but also the low-temperature properties are improved.

The amount of the blending of the thermoplastic polyester elastomer is in the range of 10 to 60% by weight and preferably in the range of 10 to 50% by weight, in the resin components. When the amount of the blending of the thermoplastic polyester elastomer falls in this range, the adhesion between the cable outermost layer and the molding material is good, and not only the watertightness and the airtightness are secured but also the water resistance is good.

Further, this resin composition may be blended with another resin component in the range where the properties owing to the above elastomer whose hard segment is a polyamide, the above thermoplastic polyester elastomer, and the above thermoplastic styrene-series elastomer are not impaired.

Further, by blending, as an additive, a fine-grain silica, the abrasion resistance of the resin composition can be improved. In regard to the fine-grain silica, use can be made of any fine-grain silica produced by a wet method or a dry method, i.e. without regard to the production method. As such a fine-grain silica, for example, "Aerozil" (trade name; manufactured by Nippon Aerozil Co., Ltd.) and "Tokuseal" (trade name; manufactured by Tokuyama Soda Co., Ltd.) are placed on the market.

The preferable amount of the blending of the fine-grain silica is 0.5 to 5 parts by weight, per 100 parts by weight of the total amount of the resin components, and if the amount is over 5 parts by weight, the cold resistance of the cable may be lowered unpreferably.

The covering layer provided on the outside of the multi-core stranded wire is preferably made up of two or more layers, in order to increase the roundness of the cable cross section. The covering material of the inner layer out of the plural covering layers is chosen taking, for example, the adhesion between the outermost covering layer and the inner layer into consideration. Particularly, the covering material of the inner layer is preferably any one of an ethylene-vinyl acetate/vinyl chloride graft copolymer, a thermoplastic polyamide elastomer, a thermoplastic polyester elastomer, and a thermoplastic polyurethane, or a resin composition whose base resin is a mixture of them, or any of an ethylene/vinyl acetate copolymer and an ethylene/α-olefin copolymer, each having a density of 0.86 to 0.90 g/cm$^3$, or a resin composition whose base resin is a mixture of the copolymers.

Further, when, as the covering material of the inner layer, a resin composition whose base resin is at least one selected from the group consisting of ethylene/vinyl acetate copolymers and ethylene/α-olefin copolymers having a density of 0.86 to 0.90 g/cm$^3$ is used, the cable can be made inexpensively while keeping the airtightness between the inner layer and the outer layer and the repeated flexing (bending) properties.

In the present invention, the ethylene/α-olefin copolymer is a copolymer of ethylene with at least one α-olefin, such as propylene, 1-butene, 4-methyl-1-pentene, 1-hexene, 1-octene, 1-decene, and 1-dodecene, and preferably the copolymer has a density of 0.86 to 0.90 g/cm$^3$ in view of the crosslinkability and the resiliency. On the other hand, the ethylene/vinyl acetate copolymer is preferably one having a vinyl acetate content of 10 to 30% by weight, in view of the crosslinkability and the resiliency. It is possible to use the ethylene/α-olefin copolymer and the ethylene/vinyl acetate copolymer singly or by mixing them.

Particularly preferably, when the covering layer is made of two layers, the inner layer of the covering layer can be composed of ethylene/vinyl acetate copolymer (EVA) mixed with i) a polyolefin resin modified with an unsaturated carboxylic acid or its derivative (e.g. maleic anhydride), such as an L-LDPE modified with maleic acid, or ii) an ethylene/acrylate/unsaturated carboxylic acid or its derivative (e.g. maleic anhydride) ternary copolymer, for further improvement of mechanical strength.

By crosslinking the resin composition constituting the inner layer, the heat resistance thereof can be improved, and when the molding is carried out by using a resin having a high melting point, such as a polybutylene terephthalate and a polyamide, it is preferable that the resin composition is crosslinked.

As the method for crosslinking the covering layer, the crosslinking method wherein ionizing radiation is used and the chemical crosslinking method that are conventionally known can be used, with preference given, in view of the productivity, to the crosslinking method wherein irradiation of ionizing radiation, such as an electron beam, is carried out. The dose of the electron beam is suitably 1 to 30 Mrads.

Further, in the case of the chemical crosslinking method, a resin composition containing an organic peroxide as a crosslinking agent blended therewith is used and after the extrusion molding, the crosslinking is completed by heating it.

The resin composition used in the outermost layer of the covering layer can be improved further in the heat resistance, the chemical resistance, and the water resistance by crosslinking it to a suitable extent. The highest improvement in the adhesion and the heat resistance is recognized preferably when the gel fraction is 5 to 50%. If the gel fraction is too small, the crosslinking effect cannot be recognized, for example, in such a way that the cable covering layer is melted in a high-temperature atmosphere at 200° C. or over. If the gel fraction is too large, the adhesion that is an object of the present invention is lowered, thereby impairing the airtightness and the watertightness as a result.

The resin composition constituting the covering layer of the cable of the present invention may optionally be blended with various additives that are generally used in insulted wires or cables, such as an antioxidant, a metal deactivator, a flame retarder, a dispersant, a colorant, a filler, and a lubricant, in the ranges where the object of the present invention is not impaired.

Particularly, in the application to automobiles, the addition of a flame retarder is indispensable.

As the antioxidant, can be mentioned, for example, amine-series antioxidants, such as 4,4'-dioctyl diphenylamine, N,N'-diphenyl-p-phenylenediamine, and polymers of 2,2,4-trimethyl-1,2-dihydroquinoline; phenol-series antioxidants, such as pentaerythrityl-tetrakis(3-(3,5-di-t-butyl-4-hydroxyphenyl)propionate), octadecyl-3-(3,5-di-t-butyl-4-hydroxyphenyl)propionate, and 1,3,5-trimethyl-2,4,6-tris(3,5-di-t-butyl-4-hydroxybenzyl)benzenes; and sulfur-series antioxidants, such as bis(2-methyl-4-(3-n-alkylthiopropionyloxy)-5-t-butylphenyl)sulfide, 2-mercaptobenzimidazole and its zinc salts, and pentaerythritol-tetrakis(3-lauryl-thiopropionate).

As the metal deactivator, can be mentioned, for example, N,N'-bis(3-(3,5-di-t-butyl-4-hydroxyphenyl)propionyl)hydrazine, 3-(N-salicyloyl)amino-1,2,4-triazole, and 2,2'-oxamidobis-(ethyl 3-(3,5-di-t-butyl-4-hydroxyphenyl)propionate).

As the flame retarder, can be mentioned, for example, halogen-series flame retarders, such as tetrabromobisphenol A (TBA), decabromodiphenyl oxide (DBDPO), octabromo-diphenyl ether (OBDPE), hexabromocyclododecane (HBCD), bistribromophenoxyethane (BTBPE), tribromophenol (TBP), ethylenebistetrabromophthalimide, TBA/polycarbonate oligomers, brominated polystyrenes, brominated epoxys, ethylenebispentabromodiphenyl, chlorinated paraffins, and dodecachlorocyclooctane; inorganic-series flame retarders, such as aluminum hydroxide and magnesium hydroxide, and phosphorus-series flame retarders, such as phosphoric acid compounds, polyphosphoric acid compounds, and red phosphorus compounds.

As the flame retarding auxiliary and the filler, can be mentioned, for example, carbons, clays, zinc oxide, tin oxides, magnesium oxide, molybdenum oxides, antimony trioxide, silica, talc, potassium carbonate, magnesium carbonate, and zinc borate.

In the cable of the present invention, in molding an end section of the cable with two types of thermoplastic resins, i.e. a PBT resin and a PA resin, the cable covering material and the molding material are adhered firmly, and the airtightness and the watertightness at the interface between the cable and the molded body are kept for a long period of time without taking any particular sealing measures. Thereby the corrosion of the conductors of the insulated wires in the cable and the deterioration of the performance of the connected parts of machinery and tools can be prevented. Further, since, in the cable of the present invention, a covering material quite excellent in water resistance as well as excellent in heat resistance and extrusion property is employed, the cable of the present invention can be used as a wiring cable for automobiles, robots, electronic machinery and tools, and the like, stably for a long period of time.

Now, the present invention is described in more detail on the basis of the following Examples, but the invention is not limited to them.

EXAMPLES

Examples 1 to 10 and Comparative Examples 1 to 7

A low-density polyethylene was extruded to cover a conductor (having a diameter of 1 mm$\phi$ and composed of 20 tan-plated annealed copper stranded wires each having a diameter of 0.18 mm$\phi$), so that the outer diameter would be 1.7 mm. Then it was irradiated with an electron beam with the acceleration voltage of 500 keV and the dose of 20 Mrads, to obtain an insulated conductor having a crosslinked-polyethylene insulating layer. Two of such insulating conductors were intertwined, to prepare a multicore stranded wire.

Then, in each case, either resin of (A) a thermoplastic polyurethane and (B) an ethylene/vinyl acetate copolymer, shown in the following tables, was extruded to cover the above multicore stranded wire, using a 40-mm$\phi$ extruder (L/D=25), at a die temperature of 180° C. under the conditions of C3=170° C., C2=160° C., and C1=150° C. toward the feeder side, to form an inner layer of the covering layer, so that the outer diameter would be 4.2 mm$\phi$. Then, an outer layer resin composition, shown in the following tables, was extruded to cover the inner layer under the same conditions as for the inner layer, so that the outer diameter would be 5.0 mm$\phi$. Then, after the extrusion covering, it was irradiated with an electron beam with the acceleration voltage of 1,000 keV and the dose shown in the tables, to crosslink the covering layer, thereby preparing a cable with the covering layer composed of two layers as shown in FIG. 2.

With-respect to each of the thus-prepared cables, various properties were evaluated by the following test methods. The results thereof are also shown in Tables 1 to 3.

1) Gel fraction in the outer layer

The extraction was carried out using dimethylformamide as an extractant for 24 hours in accordance with JIS C 3005, followed by drying, then the extraction was further carried out using xylene as an extractant for 24 hours in accordance with JIS C 3005, followed by drying, and the gel fraction was measured.

2) Peel strength between the cable and PBT resin or PA resin, and whether there were any residue after peeling-off a) The covering layer of a prescribed length of the cable was divided longitudinally into two, the insulating conductors were removed away, b) the divided covering layer that was semicircular in cross section was set in a mold, and c) a PBT resin or a PA resin (nylon 12) was injected into the mold, to form a resin mold on the covering layer.

The obtained resin molded body was subjected to a peeling test. In the peeling test, the cable covering layer was peeled off from the resin molded body at an angle of 90° at a speed of 50 mm/min, the maximum strength at that time was measured, in addition to this it was observed whether there was any residue of the cable covering material remained on the resin molded body surface where peeling was done. When the covering material was broken due to the cohesive power and some residue thereof remained on the molded body surface was designated "○", whereas when no residue was remained on the molded body surface was designated "X".

3) Airtightness at an end

Figure 3:
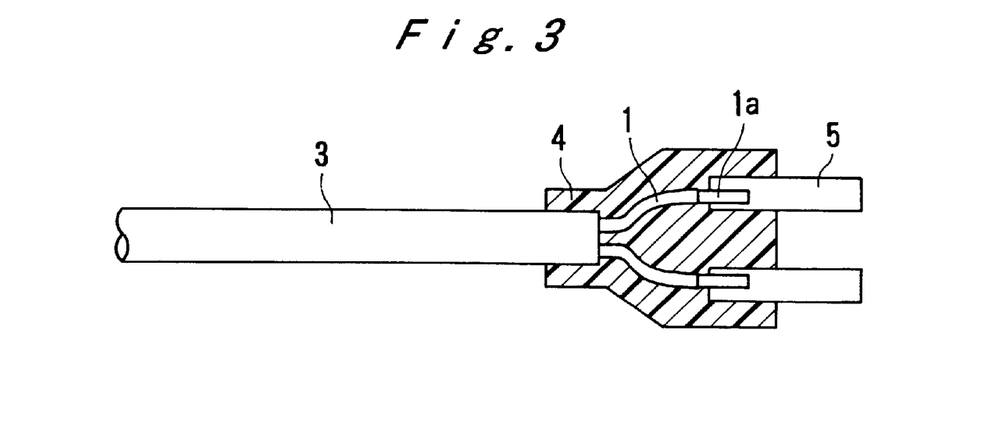
FIG. 3 is an illustrative view of an airtightness test of an end section of a cable carried out in Examples and Comparative Examples.

As shown in FIG. 3, the covering layers 2 and 1b of the cable 3 were removed to expose the conductors 1a, and electrode terminals 5 were connected to the ends thereof. Then, the connected sections and the nearby part around it were covered with a resin molded body 4 by molding (injection-molding) with a PBT resin.

This cable was subjected to a heat shock test wherein 100 cycles or 500 cycles were carried out with one cycle being 120° C.×1 hour and −40° C.×1 hour. Thereafter, from the end opposite to the resin molded body side, compressed air at 2 atmospheres was injected with the resin molded body side immersed in water, and the airtightness was determined to find whether or not there was bubbling on the resin molded body side.

5 samples were tested. When all of them were passed the test, it was designated "○", and when any one of them was not passed the test, it was designated "X".

4) Water Resistance

Only the outer skin was divided into halves and taken from the cable sample, followed by punching by a ⅛ inch dumbbell. The punched sample was polished so that the surface would become smooth, and thereafter, it was immersed in hot water at 90° C. for 240 hours. The immersed sample was subjected to a tensile test using a constant-rate tensile tester with the distance between gages being 20 mm and the tension rate being 500 mm/min, to measure the tensile strength at breakage (T.S.) and the extension at breakage (El.).

The result was expressed in terms of percentage to T.S. and El before the immersion in hot water.

5) Outward appearance

The outward appearance of the cable was visually observed.

6) Low-temperature property

After the cable was wound five times around a 45-mmϕ mandrel at 65 degrees, it was observed for whether or not there were any cracks. The results are shown in terms of the number of passed items.

7) Abrasion resistance

Figure 4:
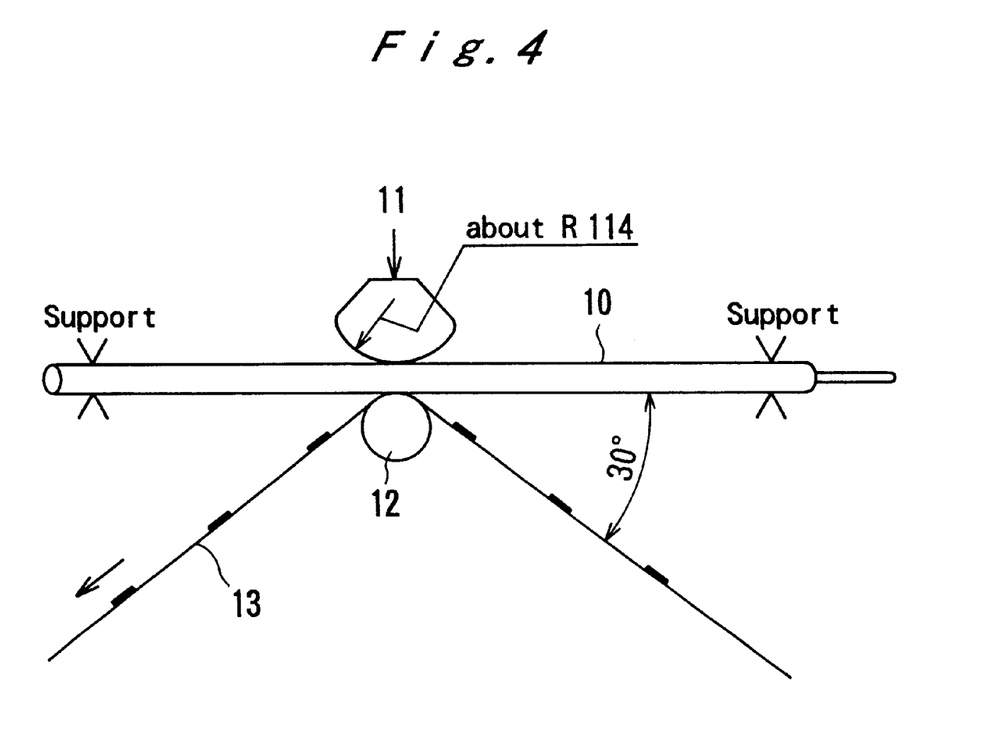
FIG. 4 is an illustrative view of an abrasion resistance evaluation apparatus used in the Examples and Comparative Examples.

The apparatus shown in FIG. 4 was used, a load 11 of 600 gf was applied to the cable sample 10 that was supported and fixed, and after an abrasion tape 13 (No. 150 G abrasion tape) was moved 3 m at 1,500 mm/min by a roller 12 (having a diameter of 7 mm) placed on the side opposite to the load, the outer diameter of the cable sample 10 was measured. When the reduction in the outer diameter by the abrasion was 0.4 mm or less, it was designated "○", and when the reduction in the outer diameter by the abrasion was over 0.4 mm, it was designated "X".

Parenthetically, the components used, shown in Tables 1 to 3, were the following ones:

(01) TPAE (thermoplastic polyamide elastomer) manufactured by Toray Industries, Inc; trade name: Pebax 3533

(02) TPU (thermoplastic polyurethane) manufactured by Nippon Miractran Co., Ltd.; trade name: E-385PNAT (03) TPEE (thermoplastic polyester elastomer) manufactured by Toray-Du Pont Co., Ltd.; trade name: Hytrel 2300X06

(04) SEPS (thermoplastic styrene-series elastomer (SEP-series) manufactured by Kuraray Co., Ltd.; trade name: Septon 2007

(05) Pentaerythrityl-tetrakis(3-(3,5-di-t-butyl-4-hydroxyphenyl)propionate) manufactured by Ciba-Geigy AG; trade name: Irganox 1010

(06) Ethylenebispentabromodiphenyl manufactured by Albemarle Co.; trade name: Sitex 8010

(07) Antimony trioxide manufactured by Suzu Kozan Komu-kyoku; trade name: Sensei Fine-grain silica manufactured by Nippon Aerosil Co., Ltd.; trade name: Aerozil 200

(A) Thermoplastic polyurethane manufactured by Nippon Miractran Co., Ltd.; trade name: E-385PNAT (B) Ethylene/vinyl acetate copolymer manufactured by Mitsui-Du Pont Polychemicals Co.; trade name: Evaflex V527-4

TABLE 1

| | Example 1 | Example 2 | Example 3 | Example 4 | Example 5 | Example 6 |
|---|---|---|---|---|---|---|
| Outer layer resin composition | | | | | | |
| TPAE (01) | 30 | 40 | 55 | 15 | 35 | 30 |
| TPU (02) | 30 | 10 | 30 | 30 | 55 | 20 |
| TPEE (03) | 30 | 50 | 15 | 55 | 30 | 30 |
| SEPS (04) | 10 | — | — | — | — | 20 |
| Pentaerythrityl-tetrakis(3-(3,5-di-t-butyl-4-hydroxyphenyl)propionate) (05) | 1 | 1 | 1 | 1 | 1 | 1 |
| Ethylenebispentabromodiphenyl (06) | 10 | 10 | 10 | 10 | 10 | 10 |
| Antimony trioxide (07) | 5 | 5 | 5 | 5 | 5 | 5 |
| Fine-grain silica (08) | — | — | — | — | — | — |
| Inner layer resin | B | B | A | B | B | B |
| Dose [Mrads] | 10 | 10 | 10 | 10 | 10 | 10 |
| Cable property | | | | | | |
| Gel fraction of the outer layer [%] | 16 | 14 | 17 | 15 | 17 | 13 |
| Adhesion strength to PBT [N] | >5.0 | >5.0 | 3.0 | >5.0 | 4.2 | >5.0 |
| Presence or absence of any residue after peeling-off | ○ | ○ | ○ | ○ | ○ | ○ |

TABLE 1-continued

|  | Example 1 | Example 2 | Example 3 | Example 4 | Example 5 | Example 6 |
|---|---|---|---|---|---|---|
| Airtightness (PBT) | | | | | | |
| 100 cycles | ○ | ○ | ○ | ○ | ○ | ○ |
| 500 cycles | ○ | ○ | ○ | ○ | ○ | ○ |
| Adhesion strength to PA [N] | >5.0 | >5.0 | >5.0 | 2.9 | 3.9 | >5.0 |
| Presence or absence of any residue after peeling-off | ○ | ○ | ○ | ○ | ○ | ○ |
| Airtightness (PA) | | | | | | |
| 100 cycles | ○ | ○ | ○ | ○ | ○ | ○ |
| 500 cycles | ○ | ○ | ○ | ○ | ○ | ○ |
| Water resistance: TS residual rate [%] | 88 | 80 | 90 | 78 | 89 | 87 |
| Water resistance: EI residual rate [%] | 85 | 77 | 88 | 75 | 84 | 84 |
| Outward appearance | ○ | ○ | ○ | ○ | ○ | ○ |
| Low-temperature property | ○ | ○ | ○ | ○ | ○ | ○ |
| Abrasion resistance | ○ | ○ | ○ | ○ | ○ | Δ |

TABLE 2

|  | Example 7 | Example 8 | Example 9 | Example 10 | Comparative example 1 | Comparative example 2 |
|---|---|---|---|---|---|---|
| Outer layer resin composition | | | | | | |
| TPAE (01) | 30 | 35 | 30 | 40 | 5 | 50 |
| TPU (02) | 30 | 30 | 30 | 30 | 45 | 45 |
| TPEE (03) | 30 | 30 | 30 | 20 | 50 | 5 |
| SEPS (04) | 10 | 10 | 10 | 10 | — | — |
| Pentaerythrityl-tetrakis(3-(3,5-di-t-butyl-4-hydroxyphenyl)propionate) (05) | 1 | 1 | 1 | 1 | 1 | 1 |
| Ethylenebispentabromodiphenyl (06) | 10 | 10 | 10 | 10 | 10 | 10 |
| Antimony trioxide (07) | 5 | 5 | 5 | 5 | 5 | 5 |
| Fine-grain silica (08) | 1 | — | 4 | 3 | — | — |
| Inner layer resin | B | B | B | B | B | B |
| Dose [Mrads] | 10 | 10 | 10 | 10 | 10 | 10 |
| Cable property | | | | | | |
| Gel fraction of the outer layer [%] | 16 | 16 | 17 | 18 | 15 | 17 |
| Adhesion strength to PBT [N] | >5.0 | >5.0 | >5.0 | >5.0 | >5.0 | 0.5 |
| Presence or absence of any residue after peeling-off | ○ | ○ | ○ | ○ | ○ | ○ |
| Airtightness (PBT) | | | | | | |
| 100 cycles | ○ | ○ | ○ | ○ | ○ | X |
| 500 cycles | ○ | ○ | ○ | ○ | ○ | X |
| Adhesion strength to PA [N] | >5.0 | >5.0 | >5.0 | >5.0 | 1.1 | 4.8 |
| Presence or absence of any residue after peeling-off | ○ | ○ | ○ | ○ | ○ | X |
| Airtightness (PA) | | | | | | |
| 100 cycles | ○ | ○ | ○ | ○ | X | ○ |
| 500 cycles | ○ | ○ | ○ | ○ | X | ○ |
| Water resistance: TS residual rate [%] | 84 | 87 | 95 | 89 | 80 | 90 |
| Water resistance: EI residual rate [%] | 88 | 84 | 87 | 88 | 75 | 87 |
| Outward appearance | ○ | ○ | ○ | ○ | ○ | ○ |
| Low-temperature property | ○ | ○ | ○ | ○ | ○ | ○ |
| Abrasion resistance | ○ | ○ | ○ | ○ | ○ | ○ |

TABLE 3

|  | Comparative example 3 | Comparative example 4 | Comparative example 5 | Comparative example 6 | Comparative example 7 |
|---|---|---|---|---|---|
| Outer layer resin composition | | | | | |
| TPAE (01) | 70 | 10 | 50 | 15 | 20 |
| TPU (02) | 20 | 20 | — | 70 | 30 |
| TPEE (03) | 10 | 70 | 50 | 15 | 20 |
| SEPS (04) | — | — | — | — | 30 |
| Pentaerythrityl-tetrakis(3-(3,5,-di-t-butyl-4-hydroxyphenyl)propionate) (05) | 1 | 1 | 1 | 1 | 1 |
| Ethylenebispentabromodiphenyl (06) | 10 | 10 | 10 | 10 | 10 |

TABLE 3-continued

|  | Comparative example 3 | Comparative example 4 | Comparative example 5 | Comparative example 6 | Comparative example 7 |
|---|---|---|---|---|---|
| Antimony trioxide (07) | 5 | 5 | 5 | 5 | 5 |
| Fine-grain silica (08) | — | — | — | — | — |
| Inner layer resin | B | B | B | B | B |
| Dose [Mrads] | 10 | 10 | 10 | 10 | 10 |
| Cable property |  |  |  |  |  |
| Gel fraction of the outer layer [%] | 15 | 14 | 13 | 15 | 18 |
| Adhesion strength to PBT [N] | 1.0 | >5.0 | 0 | 2.3 | >5.0 |
| Presence or absence of any residue after peeling-off | X | ○ | X | ○ | ○ |
| Airtightness (PBT) |  |  |  |  |  |
| 100 cycles | X | ○ | — | ○ | ○ |
| 500 cycles | X | ○ | — | X | ○ |
| Adhesion strength to PA [N] | >5.0 | 1.1 | 0 | 1.7 | >5.0 |
| Presence or absence of any residue after peeling-off | ○ | X | X | X | ○ |
| Airtightness (PA) |  |  |  |  |  |
| 100 cycles | ○ | X | — | X | ○ |
| 500 cycles | ○ | X | — | X | ○ |
| Water resistance: TS residual rate [%] | 90 | 72 | — | 89 | 89 |
| Water resistance: EI residual rate [%] | 87 | 60 | — | 84 | 85 |
| Outward appearance | Δ | Δ | X | ○ | ○ |
| Low-temperature property | ○ | ○ | X | ○ | ○ |
| Abrasion resistance | ○ | ○ | X | ○ | X |

Comparative Example 1
The Gel Fraction [%] of the Outer Layer 0

Since TPU was insoluble in xylene, the gel fraction was measured using dimethylformamide.

As is apparent from the results shown in Tables 1 to 3, it can be understood that, in the cable of each of Examples of the present invention having a covering layer on the outside of a multicore stranded wire composed of plural insulated conductors that are intertwined, wherein at least the outermost layer of the covering layer is made of a crosslinked product of a resin composition containing, as resin components, (a) 10 to 60% by weight of a polyamide-series elastomer made up of a block copolymer whose hard segment is a polyamide, (b) 5 to 60% by weight of a thermoplastic polyurethane resin, (c) 10 to 60% by weight of a thermoplastic polyester elastomer, and (d) 0 to 20% by weight of a thermoplastic styrene-series elastomer, the adhesion between the cable covering material and a molded body is excellent, the airtightness at the end of the cable is secured, and the water resistance is satisfactory.

On the other hand, as can be seen from the results of Comparative Examples, it was confirmed that when the amount of the polyester elastomer was larger over the range defined in the present invention, the water resistance was poor, while when the amount of the polyester elastomer was smaller under that range, the adhesion to a polyester-series material was poor. Further, when the amount of the polyamide (nylon) elastomer is larger over the range defined in the present invention, the adhesion to a polyester-series molding material becomes poor, while when the amount of the polyamide elastomer is smaller under that range, the adhesion to a polyamide-series molding material becomes poor. Further, when the amount of the polyurethane is smaller under the range defined in the present invention, the low-temperature property and the outward appearance are lowered greatly. When the amount of the thermoplastic styrene-series elastomer among the resin components is larger over the range defined in the present invention, even though the adhesion to a PBT resin or a PA resin is satisfactory, there is a problem that the abrasion resistance is lowered, which is not preferable as the cable of the present invention that is intended to be used for automobiles, robots, electronic machinery and tools, and the like.

Having described our invention as related to the present embodiments, it is our intention that the invention not by limited by any of the details of the description, unless otherwise specified, but rather be construed broadly within its spirit and scope as set out in the accompanying claims.

What we claim is:

1. A cable having a covering layer on the outside of a multicore stranded wire composed of plural insulated conductors that are intertwined, wherein at least an outermost layer of the said covering layer is made of a crosslinked product of a resin composition containing, as resin components, (a) 10 to 60% by weight of a polyamide elastomer made up of a block copolymer whose hard segment is a polyamide, (b) 5 to 60% by weight of a thermoplastic polyurethane resin, (c) 10 to 60% by weight of a thermoplastic polyester elastomer, and (d) 0 to 20% by weight of a thermoplastic styrene elastomer, wherein the gel fraction of the outermost layer is 5 to 50%.

2. The cable as claimed in claim 1, wherein silica is contained in an amount of 0.5 to 5 parts by weight per 100 parts by weight of the total amount of the resin components in the said resin composition.

3. The cable as claimed in claim 1, wherein the said covering layer is made up of two layers, and its inner layer is composed of a resin composition containing at least one selected from the group consisting of ethylene-vinyl acetate/vinyl chloride graft copolymers, thermoplastic polyamide elastomers, thermoplastic polyester elastomers, and thermoplastic polyurethanes.

4. The cable as claimed in claim 1, wherein the said covering layer is made up of two layers, and its inner layer is composed of a resin composition containing at least one selected from the group consisting of ethylene/vinyl acetate copolymers and ethylene/α-olefin copolymers having a density of 0.86 to 0.90 g/cm$^3$.

5. The cable as claimed in claim 1, wherein the thermoplastic styrene-series elastomer (d) is in an amount of 5 to 20% by weight.

6. The cable as claimed in claim 1, wherein at least one additive selected from the group consisting of an antioxidant, a metal deactivator, a flame retarder, a dipersant, a colorant, a filler, and a lubricant is contained in the said resin composition.

7. The cable as claimed in claim 2, wherein the said covering layer is made up of two layers, and its inner layer is composed of a resin composition containing at least one selected from the group consisting of ethylene-vinyl acetate/vinyl chloride graft copolymers, thermoplastic polyamide elastomers, thermoplastic polyester elastomers, and thermoplastic polyurethanes.

8. The cable as claimed in claim 2, wherein the said covering layer is made up of two layers, and its inner layer is composed of a resin composition containing at least one selected from the group consisting of ethylene/vinyl acetate copolymers and ethylene/α-olefin copolymers having a density of 0.86 to 0.90 g/cm$^3$.

9. The cable as claimed in claim 3, wherein the inner layer is made of a crossliked product of the resin composition.

10. The cable as claimed in claim 4, wherein the inner layer is made of a crossliked product of the resin composition.

11. The cable as claimed in claim 8, wherein the ethylene/α-olefin copolymers comprise a copolymer of ethylene with at least one α-olefin selected from the group consisting of propylene, 1-butene, 4-methyl-1-pentene, 1-hexene, 1-octene, 1-decene, and 1-dodecene.

12. The cable as claimed in claim 1, wherein the covering layer is crosslinked using an electron beam at 1–30 Mrads.

13. The cable as claimed in claim 6, wherein the antioxidant is selected from the group consisting of 4,4'-dioctyldiphenylamine, N,N'-diphenyl-p-phenylenediamine, polymers of 2,2,4-trimethyl-1,2-dihydroquinoline, pentaerythrityl-tetrakis (3-(3,5-di-t-butyl-4-hydroxyphenyl)propionate), octadecyl-3-(3,-di-t-butyl-4-hydroxyphenyl)propionate, 1,3,5-trimethyl-2,4,6-tris(3,5-di-t-butyl-4-hydroxybenzyl)benzene, bis(2-methyl-4-(3-n-alkylthiopropionyloxy)-5-t-butylphenyl)sulfide, 2-mercaptobenzimidazole and its zinc salts, and pentaerythritol-tetrakis(3-lauryl-thiopropionate).

14. The cable as claimed in claim 6, wherein the metal deactivator is selected from the group consisting of N,N'-bis(3-(3,5-di-t-butyl-4-hydroxyphenyl)propionyl)hydrazine, 3-(N-salicyloyl)amino-1,2 4-triazole, and 2,2'-oxamidobis-(ethyl 3-(3,5-di-t-butyl-4-hydroxyphenyl)propionate).

15. The cable as claimed in claim 6, wherein the flame retarder is selected from the group consisting of tetrabromobisphenol A, decabromodiphenyl oxide, octabromodiphenyl ether, hexabromocyclododecane, bistribromophenoxyethane, tribromophenol, ethylenebistetrabromophthalimide, TBA/polycarbonate oligomer, brominated polystyrene, brominated epoxy, ethylenebispentabromodiphenyl, chlorinated paraffin, dodecachlorocyclooctane, aluminum hydroxide, magnesium hydroxide, phosphoric acid compounds, polyphosphoric acid compounds, and red phosphorus compounds.

16. The cable as claimed in claim 6, wherein the filler is selected from the group consisting of carbon, clay, zinc oxide, tin oxide, magnesium oxide, molybdenum oxide, antimony trioxide, silica, talc, potassium carbonate, magnesium carbonate, and zinc borate.

* * * * *